UNITED STATES PATENT OFFICE.

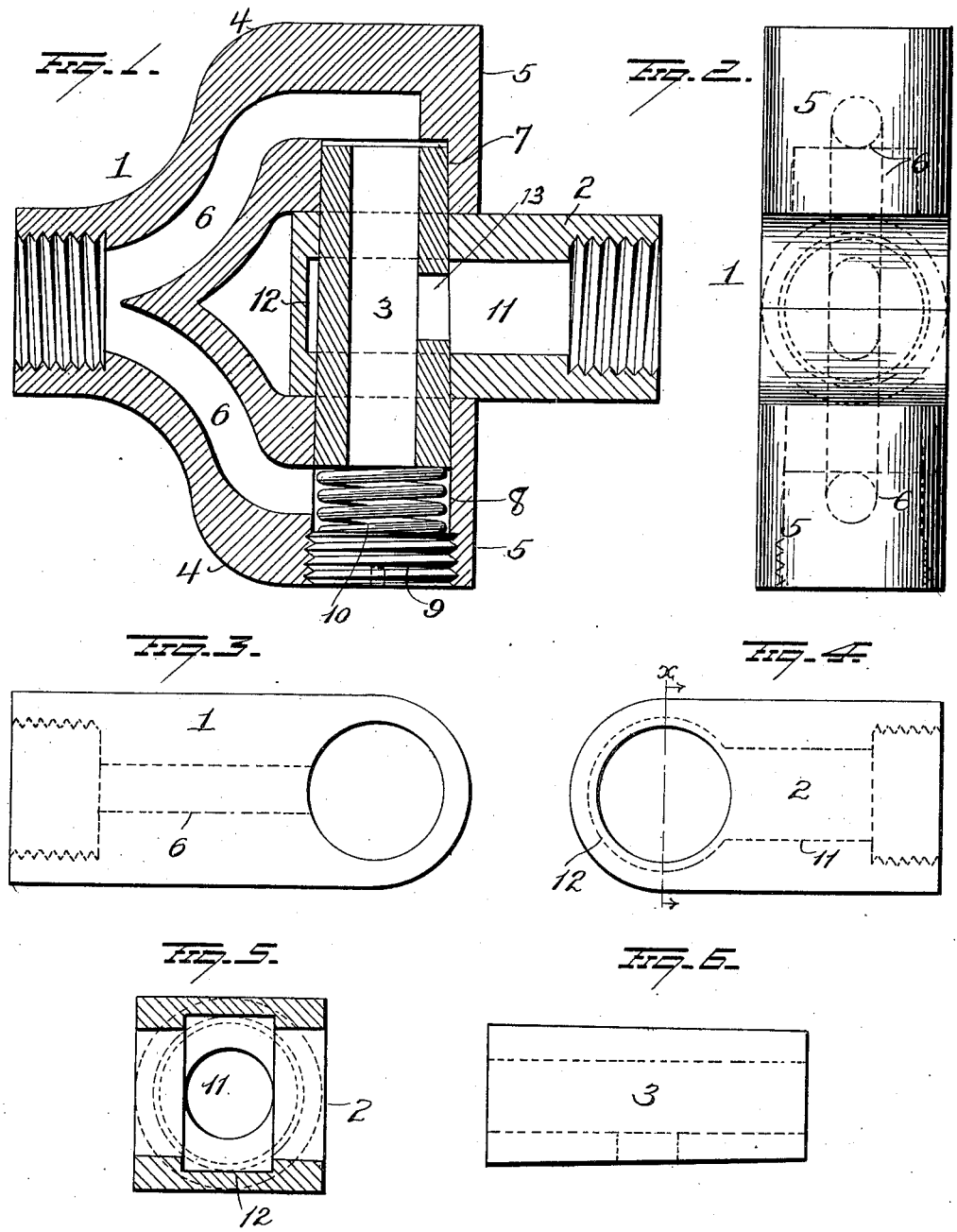

WILLIAM H. RAMSEY, OF DAWSON, PENNSYLVANIA, ASSIGNOR OF ONE-THIRD TO J. A. SMITH AND ONE-THIRD TO R. D. HENRY, OF DAWSON, PENNSYLVANIA.

FLEXIBLE PIPE-COUPLING.

1,092,390.

Specification of Letters Patent.

Patented Apr. 7, 1914.

Application filed October 15, 1913. Serial No. 795,327.

*To all whom it may concern:*

Be it known that I, WILLIAM H. RAMSEY, of Dawson, in the county of Fayette and State of Pennsylvania, have invented certain new and useful Improvements in Flexible Pipe-Couplings; and I do hereby declare the following to be a full, clear, and exact description of the invention, such as will enable others skilled in the art to which it appertains to make and use the same.

This invention relates to improvements in pipe couplings and more particularly to that type which are flexible,—one object of the invention being to so construct a flexible pipe coupling that the parts may have free relative movement without liability of leakage and without the use of packing.

A further object is to so construct a flexible pipe coupling that the connecting means between the two relatively movable members shall automatically compensate for wear and maintain a fluid-tight connection between said members.

With these and other objects in view, the invention consists in certain novel features of construction and combinations of parts as hereinafter set forth and pointed out in the claims.

In the accompanying drawing; Figure 1 is a sectional view of a flexible pipe coupling embodying my improvements; Fig. 2 is an end view of the member 1; Fig. 3 is a side elevation of the member 1; Fig. 4 is a side elevation of the member 2; Fig. 5 is a sectional view on the line $x$—$x$ Fig. 4, and Fig. 6 is a detail view of the tubular connecting pin.

My improved coupling comprises members 1 and 2 and a tubular pin 3 pivotally connecting the members 1 and 2. The member 1 is a casting made in the form of a yoke, the arms 4—4 of which unite at one end where the member is adapted for the connection of a pipe therewith, and the free ends of said arms 4—4 form rectangular heads 5, 5, which receive one end of the member 2 between them, said member 2 having flat faces to lie parallel with the flat inner faces of the heads 5 of the member 1. The outer end of the member 2 is suitably constructed for the attachment of a pipe thereto.

The yoke member 1 of the coupling is made with ducts 6 which communicate with each other at one end and terminate at their other ends in the heads 5—5 of said yoke member. One of the heads 5 is made with a recess 7 adjacent to the end of the duct in said head, and the other head 5 is made with an opening 8 which communicates with the duct 6 in this head.

The coupling pin 3 is not only tubular but it also has a conical or tapering exterior, the bearing faces for said pin in the heads 5 and in the member 2 (through which latter the pin passes to pivotally connect the members 1 and 2 together) being made slightly tapering to conform to the contour of said pin. At one end, the pin 3 terminates near the bottom of the recess 7 in one of the heads 5, while the other end of said pin terminates within the opening 8 in the other head 5. A portion of the wall of the opening 8 is threaded to receive a nut 9, which constitutes one abutment for a coiled spring 10,—the other end of said spring being caused to bear against one end of the tubular, conical connecting pin and serve to exert sufficient pressure to maintain a fluid-tight connection between said pin and the respective members 1—2 of the coupling and also to automatically compensate for wear.

The member 2 of the coupling is made with a duct 11, which communicates at its inner end with an annular duct 12 which surrounds the tubular connecting pin. The ducts 11—12 communicate with the interior of the pin through an opening 13 in the wall of said pin. By providing the annular duct 12, communication between the duct 11 of member 2 and the interior of the pin, will be insured, regardless of the angle which the members 1—2 may assume relatively to each other.

From the construction and arrangement of parts herein described and shown, it will be apparent that the flow of fluid may be traced through the duct 11 in member 2; then into the tubular pivot pin, and from the respective ends of the latter to the ducts 6 in the respective arms of the yoke member, and finally through the common outlet of said ducts 6 at the smaller end of said yoke member.

My improvements are exceedingly simple in construction; comprise a minimum number of parts; may be constructed at a small cost, and produce an efficient flexible pipe coupling without the use of packing.

Having fully described my invention what I claim as new and desire to secure by Letters-Patent, is:—

1. A flexible pipe coupling comprising a yoke-member having ducts communicating at one end and terminating at their other ends in the arms of said yoke member, a tubular member entering between the arms of the yoke member, a tubular pin open at both ends and passing through the tubular member and communicating with the duct therein, said pin terminating within the arms of the yoke member and communicating at its respective ends with the ducts therein, and means for retaining said pin against its seats in the two members and automatically compensating for wear.

2. A flexible pipe coupling, comprising a yoke member having heads at the free ends of its arms and having ducts communicating with each other at one end and terminating at their other ends in said heads, said heads having openings in their inner faces, a tubular member having a part entering between said heads, said heads and said tubular member having flat abutting faces, a tubular pin open at its ends and passing transversely through said tubular member and communicating therewith and terminating within the openings in the inner faces of the heads of the yoke member so as to communicate at its ends with the ducts in the yoke member and pivotally connect the two members of the coupling.

3. A flexible pipe coupling comprising a yoke member having ducts, said ducts communicating at one end and terminating at their other ends within the arms of said yoke member, a tubular member having one end entering between the arms of the yoke member, a tubular conical pin passing transversely through said tubular member and communicating therewith and having a bearing in said tubular member, said pin also having bearings in the arms of the yoke member, a spring within one of the arms of the yoke member and bearing against one end of said tubular, conical pin, and a nut against which the other end of said spring bears.

4. A flexible pipe coupling comprising two members, one of said members being bifurcated to receive the other, a tubular conical pin open at its ends and pivotally connecting said members, the ends of said pin being inclosed within the arms of the bifurcated member, a spring bearing against one end of said pin, ducts in the bifurcated member communicating with the open ends of said pin, an annular duct in the other member and communicating with an intermediate portion of the pin, and a duct in said last-mentioned member and communicating with said annular duct.

In testimony whereof, I have signed this specification in the presence of two subscribing witnesses.

WILLIAM H. RAMSEY.

Witnesses:
 M. HECHLINGER, Jr.,
 GEO. L. WHIPKETT.

Copies of this patent may be obtained for five cents each, by addressing the "Commissioner of Patents, Washington, D. C."